(12) United States Patent
Darden

(10) Patent No.: US 10,943,315 B2
(45) Date of Patent: Mar. 9, 2021

(54) SYSTEMS AND METHODS FOR AUTOMATED ASSESSMENT FOR REMEDIATION AND/OR REDEVELOPMENT OF BROWNFIELD REAL ESTATE

(71) Applicant: Thomas Francis Darden, Raleigh, NC (US)

(72) Inventor: Thomas Francis Darden, Raleigh, NC (US)

( * ) Notice: Subject to any disclaimer, the term of this patent is extended or adjusted under 35 U.S.C. 154(b) by 394 days.

(21) Appl. No.: 15/875,608

(22) Filed: Jan. 19, 2018

(65) Prior Publication Data

US 2018/0150926 A1 May 31, 2018

Related U.S. Application Data

(63) Continuation-in-part of application No. 13/325,732, filed on Dec. 14, 2011, now abandoned.

(51) Int. Cl.
*G06Q 50/16* (2012.01)
*G06Q 30/02* (2012.01)
*G06Q 40/06* (2012.01)
*G06F 3/0483* (2013.01)
*G06F 16/29* (2019.01)
*H04L 29/08* (2006.01)
*G06F 40/18* (2020.01)

(52) U.S. Cl.
CPC .......... *G06Q 50/16* (2013.01); *G06F 3/0483* (2013.01); *G06F 16/29* (2019.01); *G06Q 30/0278* (2013.01); *G06Q 40/06* (2013.01); *G06F 40/18* (2020.01); *H04L 67/02* (2013.01); *Y02P 90/90* (2015.11)

(58) Field of Classification Search
CPC .... G06Q 50/16; G06Q 40/06; G06Q 30/0278; G06F 16/29; G06F 3/0483; G06F 40/18; Y02P 90/90; H04L 67/02
See application file for complete search history.

(56) References Cited

U.S. PATENT DOCUMENTS 7,774,184 B2    8/2010  Balci et al.
8,271,431 B1 *  9/2012  Carrington .......... G06F 16/9537
                                                    707/603

(Continued)

OTHER PUBLICATIONS

Sigurd, Juel Kinn and Zawick, Linda, "BRAT—A tool for assessing HSE/CSR in acquisitions and mergers", [online] Apr. 2010, [retrieved on Oct. 30, 2020], pp. 1-6, Retrieved from the Internet: https://www.onepetro.org/conference-paper/SPE-126471-MS (Year: 2010).*

(Continued)

*Primary Examiner* — Lynda Jasmin
*Assistant Examiner* — Ehrin L Pratt
(74) *Attorney, Agent, or Firm* — Neo IP

(57) ABSTRACT

Systems and methods for distributed, automated management of brownfield real estate asset remediation and/or redevelopment, including at least one server computer for analyzing and providing recommendations for a potential brownfield investment, wherein the at least one server computer is paired with a web-based graphical interface for accessing and editing stored documents, pictures, tasks, and budget information related to at least one brownfield asset.

20 Claims, 10 Drawing Sheets

(56) References Cited

U.S. PATENT DOCUMENTS

| | | | |
|---|---|---|---|
| 2003/0050812 A1* | 3/2003 | Clark, III | G06Q 10/06 |
| | | | 705/7.13 |
| 2003/0106039 A1* | 6/2003 | Rosnow | G06Q 10/06 |
| | | | 717/100 |
| 2004/0044540 A1* | 3/2004 | Hulett | G06Q 10/10 |
| | | | 705/325 |
| 2004/0193703 A1* | 9/2004 | Loewy | H04L 41/0893 |
| | | | 709/220 |
| 2004/0225585 A1 | 11/2004 | Hoffman | |
| 2005/0055233 A1* | 3/2005 | Wenzlau | G06Q 10/06 |
| | | | 705/313 |
| 2005/0240623 A1* | 10/2005 | Kobza | G06F 16/958 |
| 2007/0168213 A1* | 7/2007 | Comrie | G06Q 40/12 |
| | | | 705/30 |
| 2008/0091283 A1* | 4/2008 | Balci | G06Q 10/06 |
| | | | 700/90 |
| 2008/0208637 A1 | 8/2008 | McKay et al. | |
| 2009/0254407 A1* | 10/2009 | Fagan | G06Q 10/06313 |
| | | | 705/7.23 |
| 2010/0185547 A1 | 7/2010 | Scholar | |
| 2013/0159202 A1 | 6/2013 | Darden et al. | |

OTHER PUBLICATIONS

"United States Marine Corps: Short Guide to Environmental Management Systems (EMS)", Spring 2000, pp. 1-8 downloaded from http://www.denix.osd.mil/ems/upload/usmc-short-guide-to-ems.pdf.

* cited by examiner

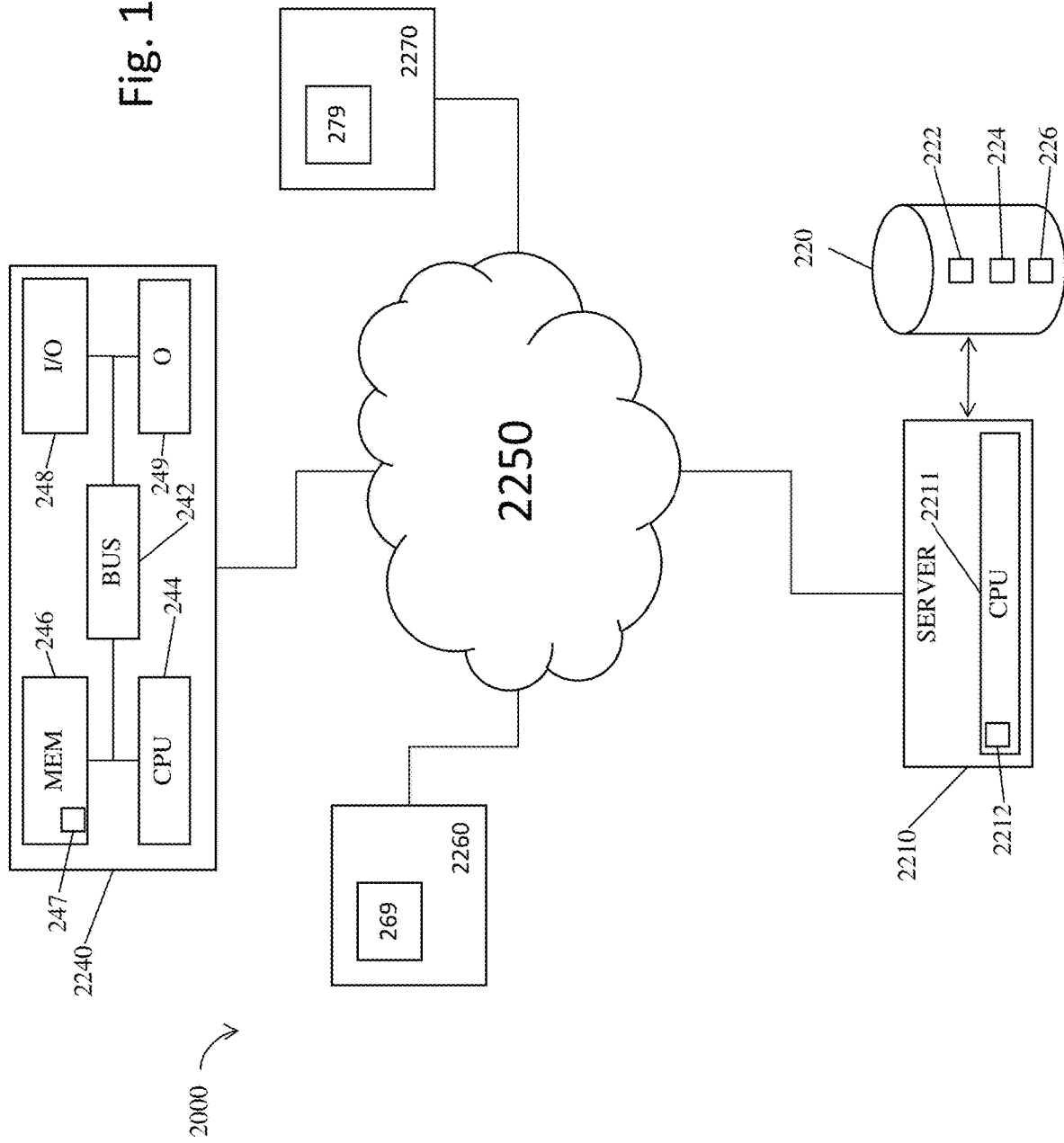

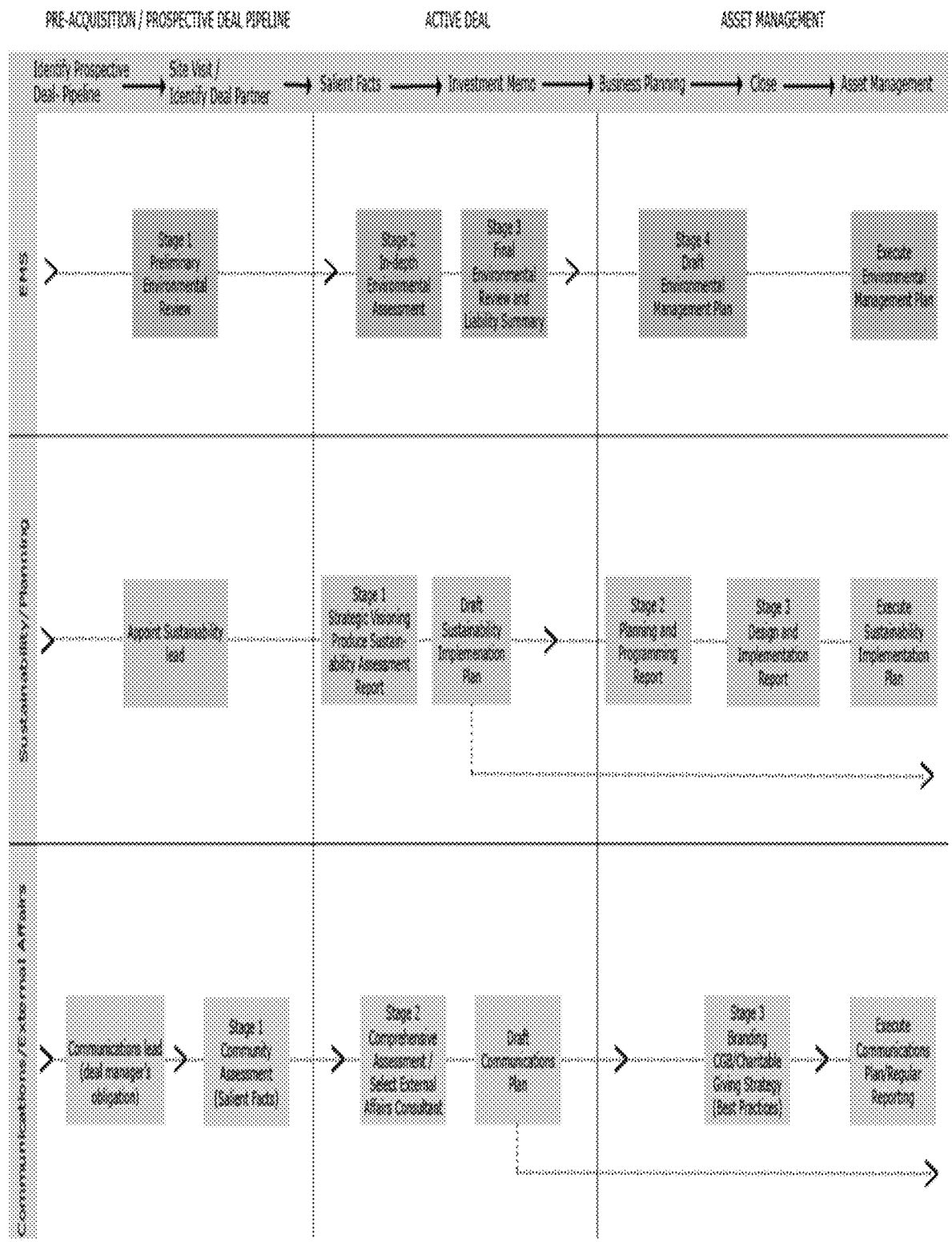
Fig. 2 MAP Process Flow

Fig. 3 Investment Underwriting Decision Tree
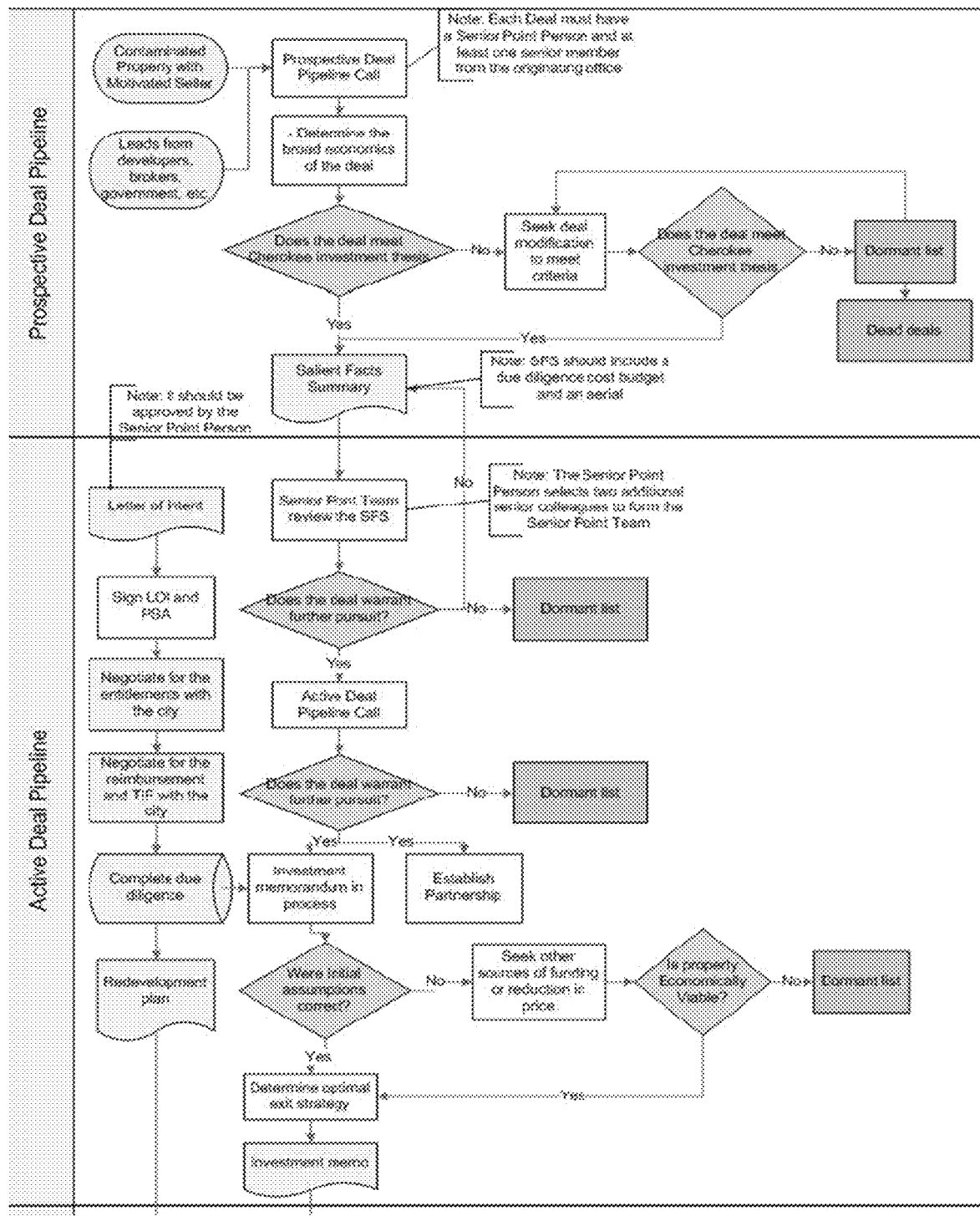
Continued in Fig. 10

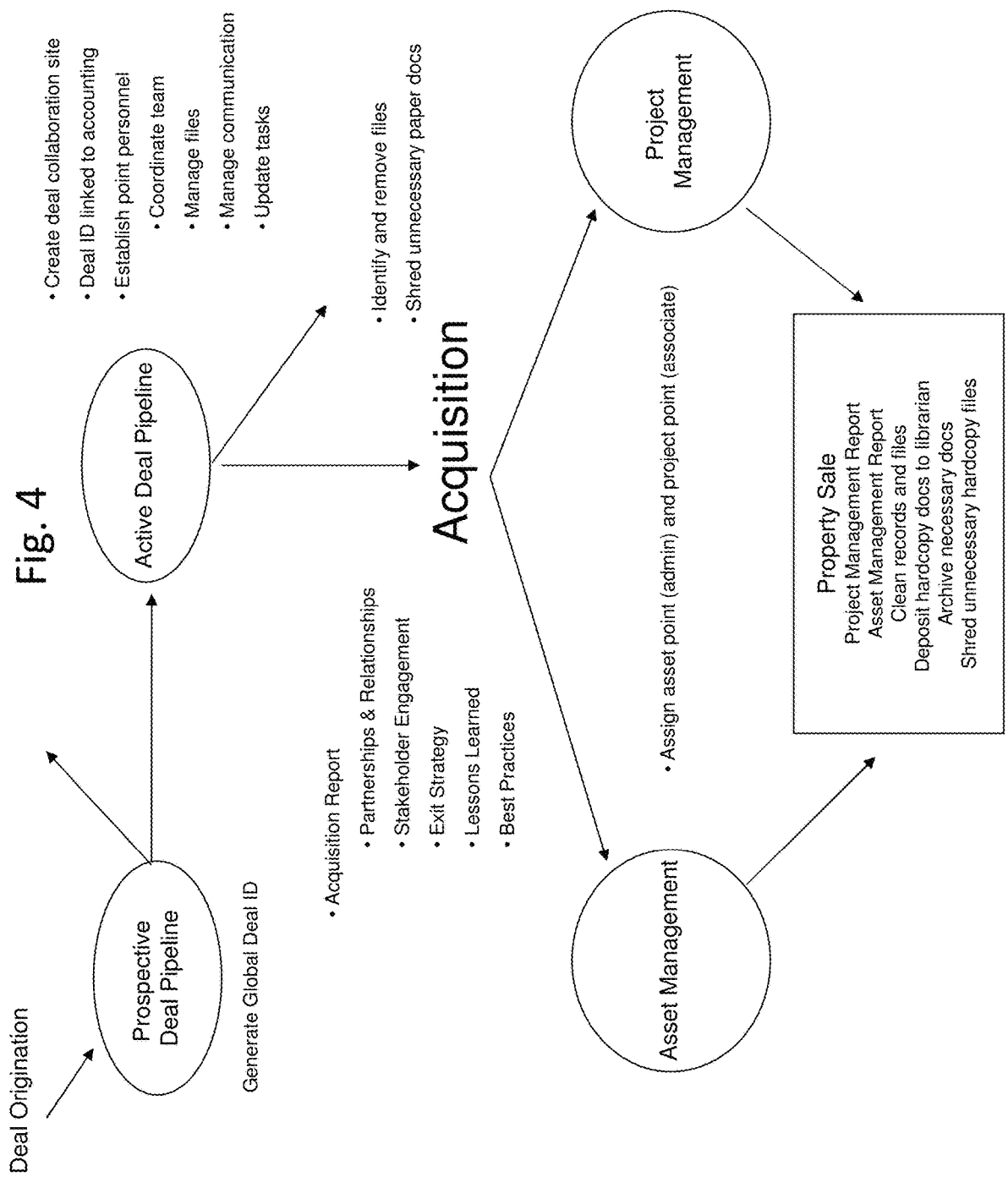

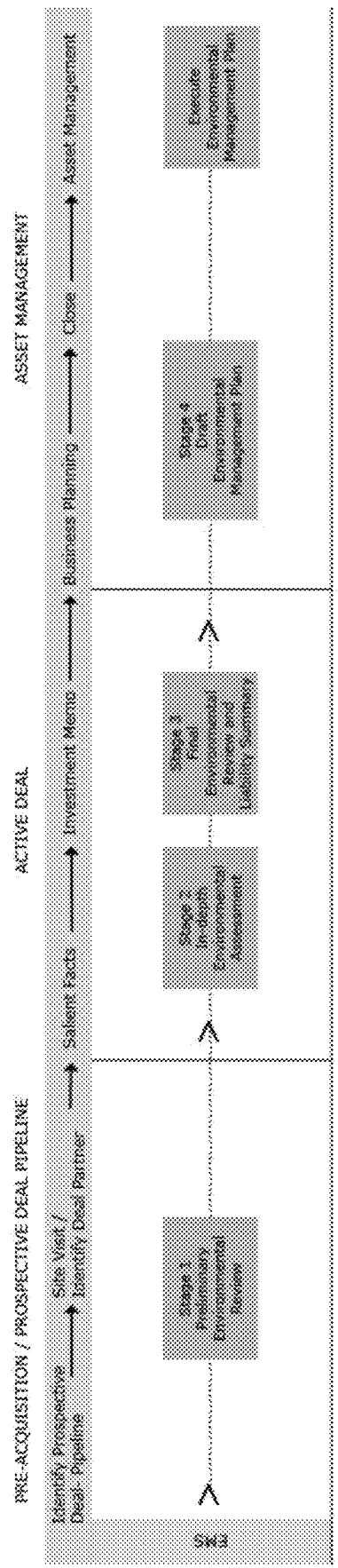
Fig. 5  Environmental Management System Process
Continuous improvement process: replicate success, prevent noncompliance and correct nonconformance with EMS standards.

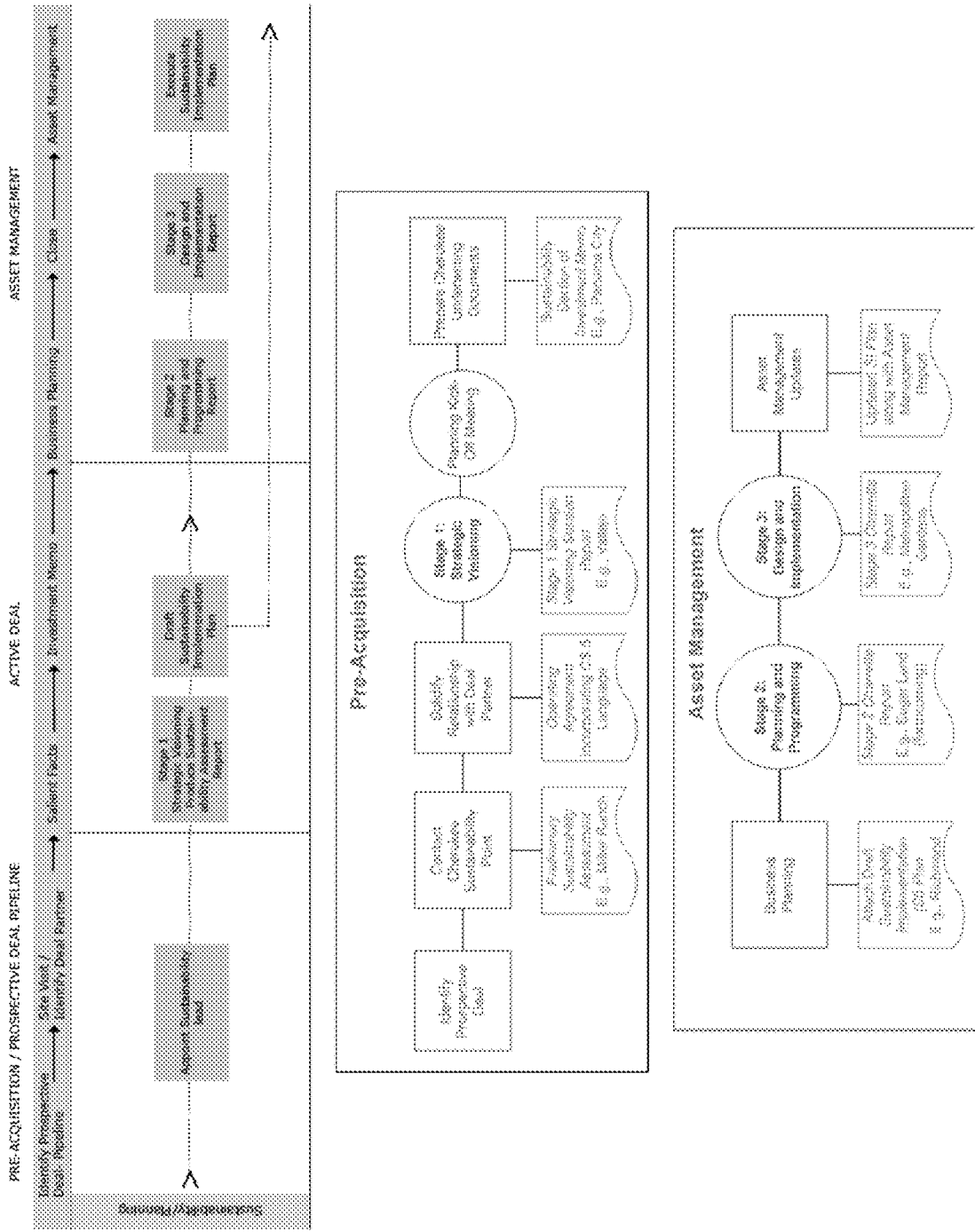
Fig. 6 Sustainable Planning & Development Process

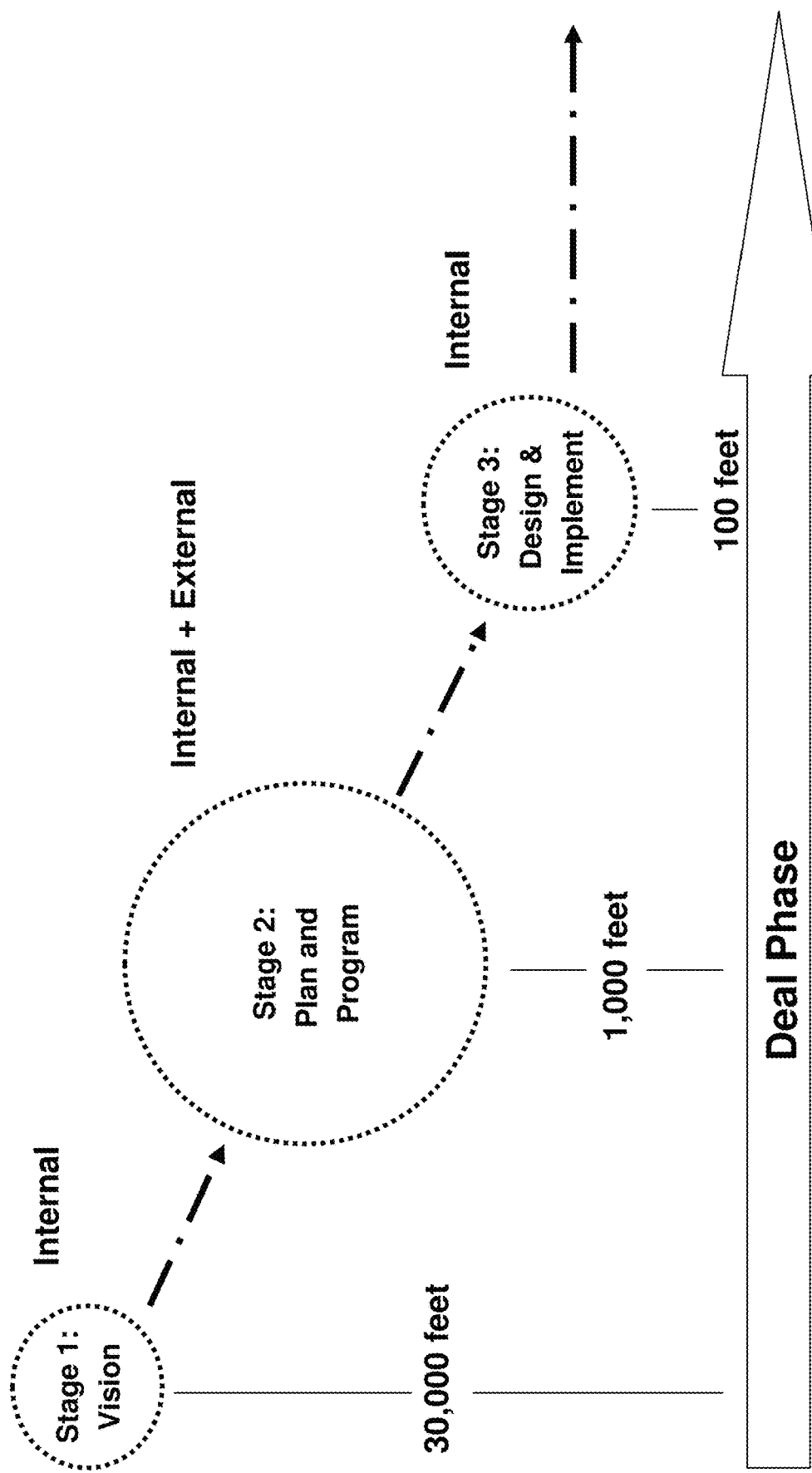

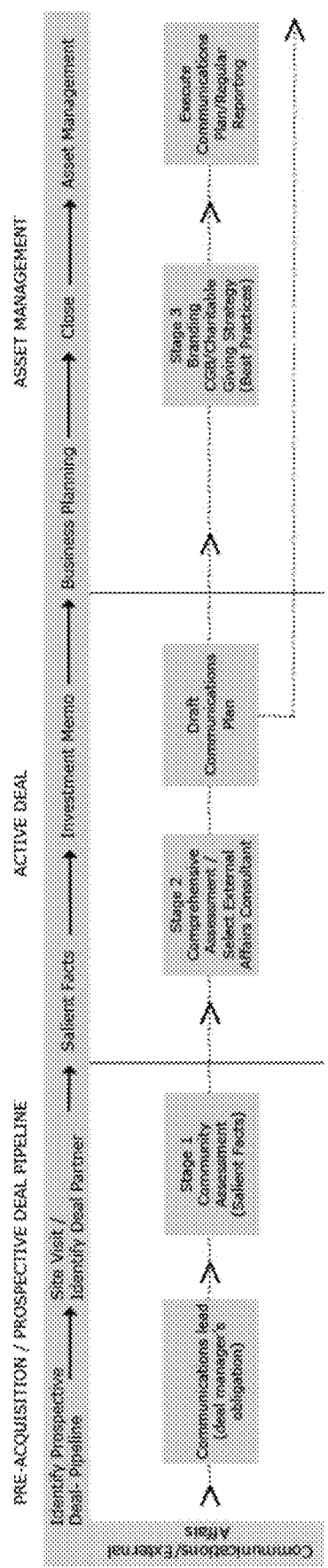
Fig. 8 Corporate Communications & External Affairs Process

Fig 9. MAP Development Process Roles

Acquire
Site Selection

Identify:
Partner with local governments and developers to identify undervalued property Evaluate:
Evaluate current site conditions, potential and context Strategize:
Develop a preliminary cleanup and reuse program

Restore
Remediation and Site Planning

Remediate:
Remediate property according to high environmental regulations

Guide:
Create a master plan with community stakeholders to guide redevelopment

Secure:
Partner with local governments and developers to secure development rights

Reuse
Site Design and Construction

Build:
Partner with municipalities and developers to build essential infrastructure Design:
Create guidelines that promote environmentally sensitive design and high-performance buildings, and influence community quality and character Sell:
Sell clean land to experienced, innovative developers Fig. 10 Investment Underwriting Decision Tree, cont.
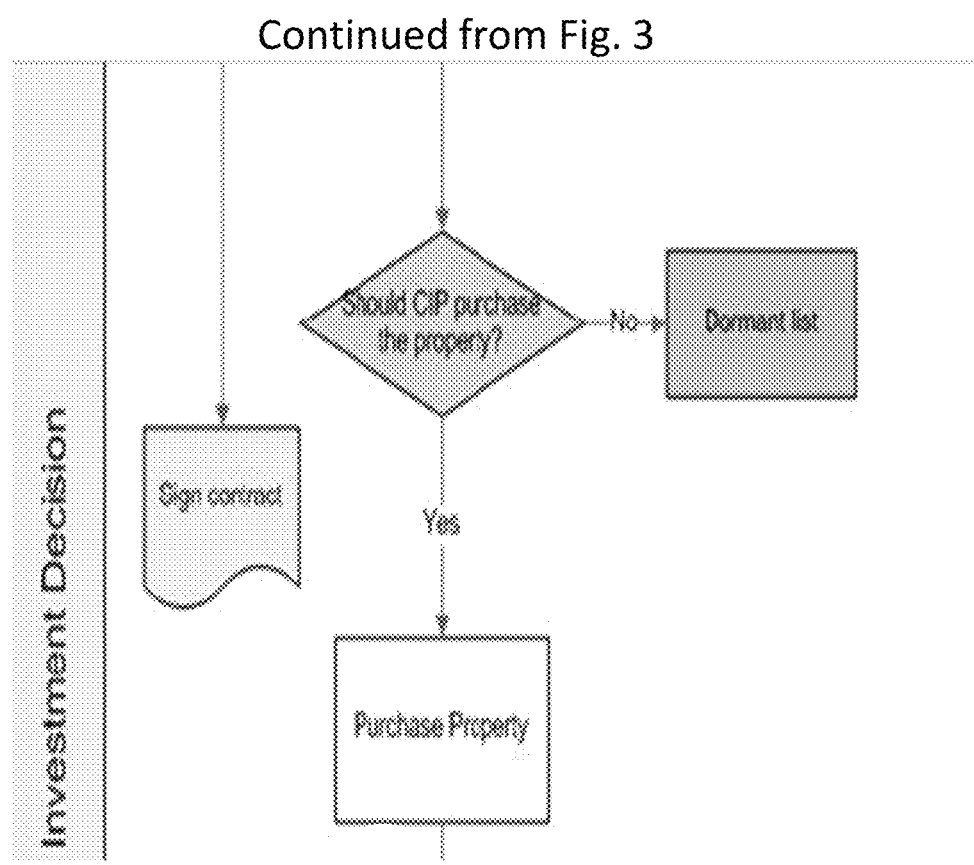

SYSTEMS AND METHODS FOR AUTOMATED ASSESSMENT FOR REMEDIATION AND/OR REDEVELOPMENT OF BROWNFIELD REAL ESTATE

CROSS-REFERENCE TO RELATED APPLICATIONS

This application is related to and claims priority from the following US patents and patent applications. This application is a continuation-in-part of U.S. application Ser. No. 13/325,732, filed Dec. 14, 2011, which is incorporated herein by reference in its entirety.

BACKGROUND OF THE INVENTION

1. Field of the Invention

The present invention relates to assessment for investing in the remediation and/or redevelopment of real estate, and more particularly, to automated optimization of assessing, remediating and redeveloping brownfield real estate.

2. Description of the Prior Art

Prior art provides for general methods for real estate development project management, including brownfield projects.

By way of example the following are relevant prior art documents relating to brownfield real estate development: U.S. Pat. No. 7,774,184 & US Pub. No. 20080091283 for Brownfield workflow and production forecast tool assigned on the face of the document to Schlumberger Technology Corp., describing a computer-based method for conducting a technical assessment phase of a brownfield assessment plan including the steps of determining an optimal set of engineering tasks to be performed in the technical assessment phase, the engineering tasks are based on at least well, operations, and facilities data; performing analysis of the well, operations and facilities data based on one or more of well information, historical well data, geological well data.

U.S. Pat. No. 7,031,838—System and method for cradle-to-grave solution for investigation and cleanup of hazardous waste impacted property and environmental media. Assignee: Integrated Environmental Services, Inc. Describes a system for environmental data management, comprising an application including: A mapping module that generates an interactive graphical mapping interface of the site, the interactive mapping interface including links to environmental data from a site and related documents; An analysis module that analyzes the environmental data, including contaminants of potential concern (COPC) data; A risk assessment module that assesses the human health risks caused by COPCs at the site; And a remediation module that screens remedial technology for cleaning up COPCs.

US Pub. No. 20080208637—Method and system for assessing environmental risk associated with parcel of real property. Assignee: American International Group, Inc. Describes a method of assessing the environmental risk associated with a property comprising: Determining the current use or uses of a property; Determining an intended use or uses of the property; Determining whether the property will be redeveloped, and if not to be redeveloped then further providing an automatic quote for environmental insurance; Determining whether underground storage tanks are present on the property, and if so, then site with tanks is excluded from the environmental insurance; Determining water distance to nearest surface water; Determining a residential distance to a nearest residential property; Determining an agricultural distance to a nearest agricultural property; Using the above steps to generate an environmental risk assessment report, wherein the report does not involve a physical inspection of the property.

US Pub. No. 20100088139—Project management system adapted for planning and managing projects. Assignee: Schlumberger Information Solutions. Describes a method for planning and managing project plans associated with one or more projects in a business, the method including generating one or more output displays adapted for planning and managing the project plans of the one or more projects in the business and providing a user with a view into the project plans.

Further describes input data that may include information such as human knowledge and experience data, encapsulated knowledge, project-specific constraints, finance data, health safety and environmental data, human resource data, and summary daily report data. Further provides as an example of a typical project dashboard, an illustration of a production project for brownfield rehabilitation (FIG. 30).

US Pub. No. 20100042420—Environmental resource management system and method. Assignee: Not Listed; Inventors: Douglas C. Hutchinson. Describes a method for managing resource usage in an area for members of the area, comprising: Determining the initial resource status of the area; Creating modification standards for the area which have environmentally beneficial attributes; Monitoring the execution of modifications to the area by members of the area for conformity to the modification standards; Managing performance of the modifications to sustain the environmental attributes of the modifications; Further describes that the step of determining the initial resource status comprises the assessment of air, soil, water, flora, and fauna of the area. Further describes that this method may be used to manage development impacts on resources from initial status (including brownfield sites) through project completion and ongoing use.

US Pub. No. 20050226688—Geomorphology environmental remediation process and systems. Assignee: Ann Arbor Technical Services & Earth Tech, Inc. Describes a method for investigating a site for possible selective removal of sediment containing a contaminant, comprising: Calculating an adjusted contaminant concentration for one or more sediment zones in a site containing a water course. Further describes designing and implementing a remediation plan based on the determination of which of the sediment zones are in need of remediation.

U.S. Pat. No. 6,253,191 & U.S. Pat. No. 7,346,572—Brownfields investing. Assignee: CLHSM, LLC. Describes a brownfield investment vehicle for investing in brownfields-related projects that supports all aspects of a brownfield remediation/development/redevelopment project while shielding investors from environmental liability.

'191 describes a method for investing in brownfields comprising: Establishing a brownfields fund, the brownfields fund providing investment capital on a non-recourse basis for brownfields projects and remaining passive with respect to the brownfields projects; Receiving investor capital from investors; Approving an entity for the investment capital on the non-recourse basis for a respective one of the brownfields projects according to a predetermined criteria, the entity having an ownership interest in a brownfield associated with one of the brownfields projects; And providing investment capital on the non-recourse basis to the approved entity using at least some of the investor capital from the investors.

'572 describes similar methods for investing in brownfields and managing brownfields funds.

SUMMARY OF THE INVENTION

The present invention relates to predictive-modeling-based optimization of brownfield real estate property redevelopment, including assessment of a property for investment quality, for remediation, and/or for redevelopment.

It is an object of this invention to provide systems and methods for assessment for investment, remediation and/or redevelopment of brownfield real estate property. Accordingly, one embodiment of this invention is directed to assessment for investment, remediation and/or redevelopment including a network-based computer system having interactive software via web-based user interface for automated process methodologies for the assessment phases, remediation phases, and/or redevelopment phases of brownfield real estate property, including required steps in each of the phases.

In one embodiment, the present invention is directed to a system for cloud based, multi-user assessment of brownfield real estate assets including at least one server computer constructed and configured to assess, manage, and display data relating to brownfield assets, at least one memory and database operable to store technical data, documents, and budget information related to the brownfield assets, wherein the at least one server computer automatically analyzes information related to at least one brownfield asset and at least one previous brownfield asset, wherein the information includes revenue and projected or calculated costs; wherein the information further includes demographics, economics, real estate performance and trends, environmental sustainability, political risks and public policy, and/or development partner potential, wherein the automatic analysis includes determining a projected rate of return for the brownfield asset; wherein the data is extracted from external and internal data sources, aggregated within the at least one memory and database, and matched to existing data or project files according to set rules, wherein the information is based on user-input data and retrieved data from external systems, wherein the at least one server computer generates an investment recommendation based on the analysis and the matched data or project files, a web-based graphical interface hosted on the at least one server computer, wherein the web-based graphical interface is operable to: store input data relating to the brownfield assets in the at least one memory and database, search the stored input data based on brownfield information categories, including demographics, economics, real estate performance and trends, environmental sustainability, political risks and public policy, and/or development partner potential, retrieve and display the stored input data in graphical charts, maps, and graphs, communicate the stored input data to an internal or external entity, wherein the user-input data includes documents, pictures, tasks, and budget information relating at least one of the brownfield assets, wherein the tasks are automatically generated by the at least one server computer based on default tasks, wherein at least one user of the multi-user distributed system is operable to approve and manage the documents, pictures, tasks, and budget information, wherein at least one of the documents corresponds to at least one of the tasks and is automatically generated based on the stored input data, and wherein the system generates an alert or notification if a line item or a total of a budget exceeds an approved amount.

In another embodiment, the present invention is directed to a method for cloud based, multi-user assessment of brownfield real estate assets including providing at least one server computer constructed and configured to assess, manage, and display data relating to brownfield assets, providing at least one memory and database operable to store technical data, documents, and budget information related to the brownfield assets, automatically analyzing information related to at least one brownfield asset and at least one previous brownfield asset, including revenue and projected or calculated costs, wherein the information further includes demographics, economics, real estate performance and trends, environmental sustainability, political risks and public policy, and/or development partner potential, determining a projected rate of return for the brownfield asset as part of the automatic analysis, extracting data from external and internal data sources, aggregating the data within the at least one memory and database, and matching the data to existing data or project files according to set rules, the at least one server computer receiving input data and retrieving data from external systems, generating an investment recommendation based on the analysis and the matched existing data or project files, providing a web-based graphical interface hosted on the at least one server computer, the web-based graphical interface: storing input data relating to the brownfield assets in the at least one memory and database, searching the stored input data based on brownfield information categories, including demographics, economics, real estate performance and trends, environmental sustainability, political risks and public policy, and/or development partner potential, retrieving and displaying the stored input data in graphical charts, maps, and graphs, communicating the stored input data to an internal or external entity, including documents, pictures, tasks, and budget information relating at least one of the brownfield assets, automatically generating tasks based on default tasks, at least one user of the multi-user distributed system approving and managing the documents, pictures, tasks, and budget information, automatically generating at least one of the documents, wherein the at least one of the documents corresponds to at least one of the tasks, and generating an alert or notification if a line item or a total of a budget exceeds an approved amount.

In yet another embodiment, the present invention is directed to a system for cloud based, multi-user assessment of brownfield real estate assets including at least one server computer constructed and configured to assess, manage, and display data relating to brownfield assets, at least one memory and database operable to store technical data, documents, and budget information related to the brownfield assets, at least one mobile device accessible to input the technical data, documents, and budget information related to the brownfield assets, including geolocation information, wherein the at least one server computer automatically analyzes information related to at least one brownfield asset and at least one previous brownfield asset, wherein the information includes revenue and projected or calculated costs; wherein the information further includes demographics, economics, real estate performance and trends, environmental sustainability, political risks and public policy, and/or development partner potential, wherein the automatic analysis includes determining a projected rate of return for the brownfield asset; wherein the data is extracted from external and internal data sources, aggregated within the at least one memory and database, and matched to existing data or project files according to set rules, wherein the information is based on data input by the at least one mobile device and data retrieved data from external systems, wherein the at least one server computer generates a spreadsheet with the analyzed information and a recommendation for investment based on the analysis and the matched existing data or project files, a web-based graphical interface accessible by the at least one mobile device and hosted on the at least one server computer, wherein the web-based graphical interface is operable to: store input data relating to the brownfield assets in the at least one memory and database, search the stored input data based on brownfield information categories, including demographics, economics, real estate performance and trends, environmental sustainability, political risks and public policy, and/or development partner potential, retrieve and display the stored input data in graphical charts, maps, and graphs, communicate the stored input data to an internal or external entity, wherein the input data includes documents, pictures, tasks, and budget information relating at least one of the brownfield assets, wherein the tasks are automatically generated by the at least one server computer based on default tasks, wherein at least one user of the multi-user distributed system is operable to approve and manage the documents, pictures, tasks, and budget information, wherein at least one of the documents corresponds to at least one of the tasks and is automatically generated based on the stored input data, and wherein the system generates an alert or notification if a line item or a total of a budget exceeds an approved amount.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1 is a schematic diagram illustrating one embodiment of the invention (basic cloud computing schematic).

FIG. 2 is a flow diagram illustrating one embodiment of the invention (entitled Development Process Flow).

FIG. 3 is a flow diagram illustrating steps in one embodiment of the invention.

FIG. 4 is a schematic diagram illustrating one embodiment of the invention.

FIG. 5 is another flow diagram illustrating steps in one embodiment of the invention.

FIG. 6 is another flow diagram illustrating steps in one embodiment of the invention and related hierarchy of stages of the present invention systems and methods.

FIG. 7 is a diagram stages in an embodiment of the invention.

FIG. 8 is another flow diagram illustrating steps in one embodiment of the invention.

FIG. 9 is a diagram illustrating process roles in one embodiment of the invention.

FIG. 10 is a flow diagram continued from FIG. 3 illustrating subsequent steps in one embodiment of the invention.

DETAILED DESCRIPTION

Referring now to the drawings in general, the illustrations are for the purpose of describing a preferred embodiment of the invention and are not intended to limit the invention thereto.

In one embodiment, the present invention is directed to a system for cloud based, multi-user assessment of brownfield real estate assets including at least one server computer constructed and configured to assess, manage, and display data relating to brownfield assets, at least one memory and database operable to store technical data, documents, and budget information related to the brownfield assets, wherein the at least one server computer automatically analyzes information related to at least one brownfield asset and at least one previous brownfield asset, wherein the information includes revenue and projected or calculated costs; wherein the information further includes demographics, economics, real estate performance and trends, environmental sustainability, political risks and public policy, and/or development partner potential, wherein the automatic analysis includes determining a projected rate of return for the brownfield asset; wherein the data is extracted from external and internal data sources, aggregated within the at least one memory and database, and matched to existing data or project files according to set rules, wherein the information is based on user-input data and retrieved data from external systems, wherein the at least one server computer generates an investment recommendation based on the analysis and the matched data or project files, a web-based graphical interface hosted on the at least one server computer, wherein the web-based graphical interface is operable to: store input data relating to the brownfield assets in the at least one memory and database, search the stored input data based on brownfield information categories, including demographics, economics, real estate performance and trends, environmental sustainability, political risks and public policy, and/or development partner potential, retrieve and display the stored input data in graphical charts, maps, and graphs, communicate the stored input data to an internal or external entity, wherein the user-input data includes documents, pictures, tasks, and budget information relating at least one of the brownfield assets, wherein the tasks are automatically generated by the at least one server computer based on default tasks, wherein at least one user of the multi-user distributed system is operable to approve and manage the documents, pictures, tasks, and budget information, wherein at least one of the documents corresponds to at least one of the tasks and is automatically generated based on the stored input data, and wherein the system generates an alert or notification if a line item or a total of a budget exceeds an approved amount.

In another embodiment, the present invention is directed to a method for cloud based, multi-user assessment of brownfield real estate assets including providing at least one server computer constructed and configured to assess, manage, and display data relating to brownfield assets, providing at least one memory and database operable to store technical data, documents, and budget information related to the brownfield assets, automatically analyzing information related to at least one brownfield asset and at least one previous brownfield asset, including revenue and projected or calculated costs, wherein the information further includes demographics, economics, real estate performance and trends, environmental sustainability, political risks and public policy, and/or development partner potential, determining a projected rate of return for the brownfield asset as part of the automatic analysis; extracting data from external and internal data sources, aggregating the data within the at least one memory and database, and matching the data to existing data or project files according to set rules, the at least one server computer receiving input data and retrieving data from external systems, generating an investment recommendation based on the analysis and the matched existing data or project files, providing a web-based graphical interface hosted on the at least one server computer, the web-based graphical interface: storing input data relating to the brownfield assets in the at least one memory and database, searching the stored input data based on brownfield information categories, including demographics, economics, real estate performance and trends, environmental sustainability, political risks and public policy, and/or development partner potential, retrieving and displaying the stored input data in graphical charts, maps, and graphs, communicating the stored input data to an internal or external entity, including documents, pictures, tasks, and budget information relating at least one of the brownfield assets, automatically generating tasks based on default tasks, at least one user of the multi-user distributed system approving and managing the documents, pictures, tasks, and budget information, automatically generating at least one of the documents, wherein the at least one of the documents corresponds to at least one of the tasks, and generating an alert or notification if a line item or a total of a budget exceeds an approved amount.

In yet another embodiment, the present invention is directed to a system for cloud based, multi-user assessment of brownfield real estate assets including at least one server computer constructed and configured to assess, manage, and display data relating to brownfield assets, at least one memory and database operable to store technical data, documents, and budget information related to the brownfield assets, at least one mobile device accessible to input the technical data, documents, and budget information related to the brownfield assets, including geolocation information, wherein the at least one server computer automatically analyzes information related to at least one brownfield asset and at least one previous brownfield asset, wherein the information includes revenue and projected or calculated costs; wherein the information further includes demographics, economics, real estate performance and trends, environmental sustainability, political risks and public policy, and/or development partner potential, wherein the automatic analysis includes determining a projected rate of return for the brownfield asset; wherein the data is extracted from external and internal data sources, aggregated within the at least one memory and database, and matched to existing data or project files according to set rules, wherein the information is based on data input by the at least one mobile device and data retrieved data from external systems, wherein the at least one server computer generates a spreadsheet with the analyzed information and a recommendation for investment based on the analysis and the matched existing data or project files, a web-based graphical interface accessible by the at least one mobile device and hosted on the at least one server computer, wherein the web-based graphical interface is operable to: store input data relating to the brownfield assets in the at least one memory and database, search the stored input data based on brownfield information categories, including demographics, economics, real estate performance and trends, environmental sustainability, political risks and public policy, and/or development partner potential, retrieve and display the stored input data in graphical charts, maps, and graphs, communicate the stored input data to an internal or external entity, wherein the input data includes documents, pictures, tasks, and budget information relating at least one of the brownfield assets, wherein the tasks are automatically generated by the at least one server computer based on default tasks, wherein at least one user of the multi-user distributed system is operable to approve and manage the documents, pictures, tasks, and budget information, wherein at least one of the documents corresponds to at least one of the tasks and is automatically generated based on the stored input data, and wherein the system generates an alert or notification if a line item or a total of a budget exceeds an approved amount.

The present invention provides systems and methods for automated methodologies and/or tools accessible via a network, such as the Internet, for assessment for quality of investment, remediation and/or redevelopment including a network-based computer system having interactive software via web-based user interface for automated process methodologies for the assessment phases, remediation phases, and/or redevelopment phases of brownfield real estate property, including required steps in each of the phases. During the assessment or "pre closing" phase, a deal assessment or an investment assessment is analyzed based upon identification of a prospective deal, identification of a deal partner, salient facts represented in a memo, an investment memo, business planning, an acquisition go/no-go decision, and asset management tools following property acquisition.

A salient facts memo template preferably includes at least the following as illustrated in TABLE 1 (immediately below):

TABLE 1

Salient Facts Template
[Project Name - Location]
[Date]

| | |
|---|---|
| Summary | Location: city and state and metropolitan statistical area |
| | Deal description: property size, development plan and exit strategy |
| | Market: current market value and historic peak to trough change in property value |
| | Financing: capital requirements, capital commitments and debt structure |
| | Environmental: any perceived or actual, current or historic impacts at the property |
| | Expected return on investment: internal rate of return and multiple |
| Property | Summary of property, including size, previous uses, ownership history, existing structures and infrastructure, and other features. |
| Location/Market | Summary of the property location and overview of local market conditions. |
| Project | Summary of the business strategy, including acquisition, remediation, development and exit. |
| Sellers/Deal Partner | Description of the property seller, deal partner, equity investors and other relevant parties. |

TABLE 1-continued

Salient Facts Template
[Project Name - Location]
[Date]

| | |
|---|---|
| Community/Politics | Summary of the extent of support and/or opposition to the project. |
| Environmental | Summary of perceived or actual, current or historic environmental impacts and remediation requirements. |
| Entitlements | Provide summary of zoning, land use classification and other permits associated with property entitlements. |
| Financing/Financial Incentives | Summary of capital commitments, debt, and other financial obligations, as well as any financial incentives. |
| Development Plan | Summary of development plan with breakdown of property types and market rates for each property type. |
| Estimated Revenue/ Project Costs | Summary of projected revenue and preliminary costs for redevelopment based on the development plan. |
| Economics | Estimates of return on equity based on proforma or back-of-the-envelope estimates (internal rate of return and multiple rates of return). |

Thus, the salient facts memo includes factors such as property description essential for identification, environmental evaluation, etc. required for analyzing the investment, rather than the procedures for project management. Steps required for remediation phase that follow building the foundation, which includes communicating core values of the project approach, i.e., core environmental values, language for operating agreements, etc., and following property acquisition, include the environmental management process, building the team, assessing and understanding the environmental issues and aspects of the project, developing environmental strategy and obtaining environmental remediation insurance, implementing the plan including preparing the site for safety and emergency responses, monitoring the process, reviewing strategy and ensuring environmental compliance; measuring performance including financial and environmental performance, conducting independent audits, and review by top management; continuous improvement to correct, prevent, and/or improve any issue presented, setting environmental performance goals and improving environmental performance. These steps ensure complete and integrated assessment of the environmental issues consistent with regulatory requirements, etc.

Furthermore, streamlined software allows for processes of manual and automatic approval throughout the pre-closing processes and upkeep of the brownfield information and budget during the post-closing phase. During the pre-approval phase, the system provides a multitude of different roles for individual users such that each role is granted access to specific aspects of the system, including approval and information editing abilities. Furthermore, contracts, negotiations, and budget management features are available to different users based on an administrator-controlled role management system. Each of these features allows for a streamlined process of securing and managing a brownfield investment through both pre-closing and post-closing features. The features and benefits of each aspect of the Methodology, Approach, Process (MAP) system will become apparent through the various embodiments described in this disclosure.

Preferably, a virtual network or cloud-based system is provided in support of a distributed network for interactive automated assessment of brownfield assets for considering investment, remediation and/or redevelopment, as illustrated in FIG. 1.

FIG. 1 is a schematic diagram of a networked system and remote server computer associated with the systems and methods of the present invention. As illustrated in FIG. 1, a basic schematic of some of the key components of the system including remote server computer and network access to the prediction market system, according to the present invention are shown. The system 2000 includes a server 2210 with a processing unit 2111. The server 2210 is constructed, configured and coupled to enable communication over a network 2250. The server provides for user interconnection with the server over the network using a personal computer (PC) 2240 positioned remotely from the server. Furthermore, the system is operable for a multiplicity of remote personal computers or terminals 2260, 2270. For example, in a client/server architecture, as shown. Alternatively, a user may interconnect through the network 2250 using a user device such as a personal digital assistant (PDA), mobile communication device, such as by way of example and not limitation, a mobile phone, a cell phone, smart phone, laptop computer, netbook, a terminal, or any other computing device suitable for network connection and with satellite geolocation capabilities. Also, alternative architectures may be used instead of the client/server architecture. For example, a thin client system or other suitable architecture may be used. The network 2250 may be the Internet, an intranet, or any other network suitable for searching, obtaining, and/or using information and/or communications. The system of the present invention further includes an operating system 2212 installed and running on the server 2210, enabling server 2210 to communicate through network 2250 with the users thereof. The operating system may be any operating system known in the art that is suitable for network communication.

An internet or intranet based dashboard is utilized to provide financial data for potential deals as well as existing assets and portfolios. The dashboard is populated with real-time data and is updated in real-time, with the real-time data coming from a multiplicity of devices connected to the intranet or internet.

The present invention also provides systems and methods for optimized automated assessment, remediation and redevelopment of brownfield real estate property including the steps of: providing a server computer operable with software for storing and analyzing data associated with each of three phases of development, including an assessment phase, a remediation phase, and a redevelopment phase of brownfield real estate property assets; providing a database for storing data relating to prior developed brownfield assets compared to an evaluation date; assessment for remediation and/or redevelopment including a network-based computer system having interactive software via web-based user interface for automated process methodologies and/or tools and/or templates for the steps for reviewing brownfield real estate property redevelopment opportunities; providing at least one server computer, located centrally or distributed over a network and operable for remote interactive connection by at least one remote computer, at least one server computer in network communication with remote computer(s) for providing remote interactive user interface with the system and for receiving inputs from the remote server computer(s) regarding data from a first target brownfield asset, the server computer operable for generating instructions for review and management of any brownfield asset by way of automated comparison to similar prior developed brownfield assets represented by data in the database. A given user may have a multiplicity of brownfield asset targets being managed by the system under the present invention. Also, preferably the multiplicity of projects are automatically compared and contrasted with each other for a given user to systematically identify which properties are most closely following best practices, (i.e., having most efficient and effective use of resources, success with remediation and redevelopment against goals, etc.) By way of example and not limitation, in one embodiment, criteria is established based upon the specific user: a project manager will have different criteria that are project milestone-based, in contrast to an investor user who will be focused more on the economic criteria of a project, etc.

Advantageously, utilization of the systems and methods of the present invention provide for cost containment for the assessment, remediation and/or redevelopment of brownfield assets and increase confidence that the remediation process is structured, disciplined, and thorough. The method for optimized automated assessment and remediation of brownfield real estate property preferably includes the steps of: providing a server computer operable with software for storing and analyzing data associated with each of three phases of development, including an assessment phase, a remediation phase, and a redevelopment phase of brownfield real estate property assets; providing criteria for automatically determining if a project relating to a first target brownfield asset is conforming to standards for brownfield development; providing assessment for remediation and/or redevelopment including a network-based computer system having interactive software via web-based user interface for automated process methodologies and/or tools for the steps for reviewing brownfield real estate property redevelopment opportunities (or project); providing at least one server computer, located centrally or distributed over a network and operable for remote interactive connection by at least one remote computer, the at least one server computer in network communication with remote computer(s) for providing remote interactive user interface with the system and for receiving inputs from the remote server computer(s) regarding data from the first target brownfield asset, the server computer operable for generating instructions for review and management of the project for any brownfield asset. Also, preferably, the assessment phase includes an investment assessment to determine whether the project will provide at least a predetermined minimum return of capital plus profit on an investment of capital required to complete the project in a predetermined time.

The method further includes providing an environmental management system (EMS) for automatically identifying errors and problems (e.g., nonconformance or noncompliance with a standard, processes, timeline, or threshold) and/or modifying processes to indicate previous errors and problems in order to prevent similar errors and problems on future projects. Thus, a self-correcting process for identifying errors and problems is built into the EMS for assisting a continuingly improving investment and management process. The system and methods of the present invention provide automation based upon intellectual capital, including smart systems that provide automatic generation of steps based upon information from past projects and preferably further include consideration of indicated and identified errors relating to nonconformance and noncompliance from the past projects. The tools and systems of the EMS are further operable to create a process for identifying and preventing nonconformance and noncompliance in future projects through automatic generation of indications or warnings in projects with similar components or related facts, features, and/or characteristics.

The present invention provides an automated, integrated solution methodology and tools (MAP) that ensures systematic, high quality environmental results in a cost-efficient and effective manner by providing remote, interactive assessment and automated comparison to relevant, similar best practices and/or prior brownfield projects having data stored in the system database. The system and methods provide for tools, templates, checklists, and flow diagrams for automated project management with best practices that ensure time savings, cost savings, and consistent approaches for redeveloping unique brownfield real estate assets. Advantageously, the systems and methods of the present invention solve longstanding, unmet needs in this field, and are informed by processes based on years of experience, so that the multiple users (multi-users) of the system benefit from the experience themselves without the need to manually analyze multiple past project and/or property data stored in MAP in order to make decisions and notice potential issues in an investment and management process.

The Environmental Management System (EMS) that forms part of the present invention is certified to ISO (International Standards Organization) environmental management standards (e.g., ISO 14001) and requires continuous improvement and annual audits. This ISO certification is unique for a private equity real estate investment company. Because of the complexities of project management with brownfield remediation and/or redevelopment compared to greenfield real estate development, and environmental and regulatory issues, the present invention provides a streamlined, systematic, integrated and interactive website-based distributed network for multi-user access to project management of brownfield asset projects, including three major phases and the steps associated with each of them.

Notably, the multi-user access to project management under the present invention provides for multi-user on one project and/or multi-user on multiple projects. The multiplicity of MAP system distributed users are selected from the group consisting of Municipal officials (planning, housing, economic development, or parks and recreation department); State government; Policy specialists; Regulators; Developers; Facilitators or mediators; Engineers and scientists; Architects; Risk assessors/Fate and Transport of contamination experts; Environmental consultants; business leaders; Public sector financial representatives; Community leaders representatives/community members; Private funding source representatives; insurance representatives; private lenders; property owners; municipal public relations experts; Environmental protection agencies; Professionals making living providing services around brownfield redevelopment; and combinations thereof.

Another key feature and functionality of the systems and methods of the present invention is that EMS is a disciplined, structured and systematic methodology with automation and visualization tools that predict outcomes for investment opportunities, generate recommendations, and provide indications and warnings based on previous projects. These systems enhance the effectiveness and efficiency of remediation and reduces problems (e.g. nonconformance or noncompliance issues) in the future, including but not limited to health or environmental problems and combinations thereof.

FIG. 2 is a flow diagram illustrating the MAP Process Flow according to the present invention.

FIG. 3 illustrates the underwriting decision tree used and automated rule sets utilized by the systems and methods of the present invention. The MAP system at its core facilitates the processes depicted in FIG. 3 and allows for approval, documentation, and storage of projects and project files. The major decision points and relationship to the MAP system are identified in the description of each feature within this disclosure.

FIG. 4 is a schematic diagram illustrating steps in the Acquisition process.

FIG. 5 is another flow diagram illustrating steps in the Environmental Management System process.

FIG. 6 is another flow diagram illustrating steps in one embodiment of the invention and related hierarchy of stages of the Sustainable Planning & Development process.

FIG. 7 is a diagram stages in the Three-Stage Sustainability Process.

FIG. 8 is another flow diagram illustrating steps in the Corporate Communications & External Affairs process).

FIG. 9 is a diagram illustrating process steps in the MAP Development Process.

Features and benefits of the present invention include but are not limited to the following:

Inspires and motivates stakeholders by providing specific project case studies in a 'before and after' format to illustrate a brownfield redevelopment project's potential impact to convert an eyesore into an asset. Project benefits are economic, environmental and/or societal.

Modeling scenarios for returns on public/private investment to support Tax Increment Financing (TIF) or ROI for public investment.

Saving time and money while ensuring a complete consideration of pertinent issues by providing a structured and disciplined approach to measuring deals against a set of criteria.

Modeling a well-considered deal for third parties to emulate, which increase the likelihood that deal is funded, as well as the likelihood of the success of the project or deal.

Saving time and money by modeling a thorough set of pre-development plans that also serves as an excellent marketing piece for a project.

Reducing the risk of project failure because of project manager or any individual's errors, omissions, and/or failure to include all factors in planning a project.

Educating the distributed multiplicity of users on key issues and effective use of time and money in planning and executing a brownfield redevelopment project.

Saving significant time over planning a complex project without any "road map" or guidelines that are relevant specifically to brownfield projects, including automated comparisons to prior brownfield developments.

Saving time and encouraging high quality outcome by providing templates for decision-making documents, e.g., by way of example and not limitation, Salient facts, Investment memos and Asset management updates.

Saving time and encouraging high quality outcome by providing spreadsheets that are automatically developed to support financial analysis and project management for brownfield asset management for a given project, wherein the remote multiplicity of users interactively input specific project numbers wherein the automated system and methods then generate thorough and sophisticated reports specific for tracking brownfield asset project management.

The present invention is further directed to methods and systems that automate the subjective nature of brownfield investment decisions by extracting, aggregating, transforming, matching, and presenting brownfield information in order to automate several processes in the decision making process of brownfield investment. The brownfield information includes financial, environmental, political, execution, infrastructure, and other measurable criterion pertinent to the investment process. The system compiles information either stored in the local MAP system (current and previous projects) or in external databases (e.g. data from the U.S. Census Bureau) and based on pre-programmed thresholds and rules is operable to output recommendations on investment as well as corresponding graphs and figures to aid in the selection of brownfield investment properties.

The information includes but is not limited to: Demographics/Economics/Real Estate Performance/Trends (national employment trends by industry, annual housing starts, annualized federal funds effective rate, National Property Index (NPI) annual returns by real estate sector, NPI annual returns by region), and Environmental Sustainability/Political Risks and Public Policy/Development Partner Potential (infrastructure spending, entitlement timing, Tax Increment Financing (TIF), solar energy use, Leadership in Energy and Environmental Design (LEED) registered projects, hybrid or electric vehicle registration, Comprehensive Environmental Response, Compensation, and Liability Information System (CERCLIS) sites, ambient air quality, number of red ozone days, voluntary cleanup programs, development partner potential). Also included in the information is an indication of present, planned, and historical funds exposure, including at least an indication for each market total exposure, debt, and equity. Population growth, household growth, per capita income growth, employment growth, unemployment rates, education statistics such as percentage of population with bachelor's degrees, master degrees, professional degrees, doctorate degrees, etc. are also considered as factors for evaluating investment in properties. Real estate performance and trends by sector are also considered, including residential properties for sale, residential properties for rent, retail properties for sale, retail properties for rent, office properties for sale, office properties for rent, industrial properties for sale, and industrial properties for rent.

Information relevant to the calculation of rate of return and return on investment is also relevant to the decision making and recommendation processes of the present invention, including sources of costs incurred and revenue received though an investment. This information includes: revenue sources, such as calculated or estimated sales, marketing, and public revenue; and/or expenses, such as design and engineering, infrastructure construction, fees and permits, and other overhead costs.

In one embodiment, employment and education trends are sourced from the Bureau of Labor Statistics or a similar entity. Alternatively, employment trends are determined from websites which include employment information such as LINKEDIN, MONSTER, FACEBOOK, etc. Analysis software determines the number or percentage of people employed in a particular sector such as construction, law, health, education, service industry, etc. or overall in a certain area which is being considered for investment. Additionally, trends in employment, such as percentage increases or decreases overall or in certain sectors are determined using the analysis software. Annual single family housing starts are also determined via the US Census or via local or cloud-based analysis software which analyzes websites which include information about new construction (number of houses, apartments, office buildings, and/or retail buildings built in a city, zip code, region, etc.) such as ZILLOW, REDFIN, etc.

The system extracts and aggregates the information, stores it in the MAP memory and database and performs transformation and matching functions according to specific rules and algorithms in order to determine a value for each brownfield site. These algorithms and matching function provide for new methods of evaluation of potential investments. Notably, the processes described herein are not identical to the steps performed mentally by humans to evaluate investments. The present invention advantageously provides for quantification of processes which were previously subjective and manual, and thus transforms the subjective skill set formerly used to evaluate properties into rules and algorithms that provide consistency, expediency, and optimization to the investment process.

In one embodiment, thresholds and rules of the system are dependent upon a financial metric, including a determined rate of return, return on investment, and/or a multiple. For example, in one embodiment, the threshold for recommendation on investment is equal to a Project Internal Rate of Return (IRR) of 1%. The system then determines a sum of all revenue, funds, and other cash inflow as well as a sum of all expenses and cash outflow relating to a particular brownfield investment site in relation to and based on the time projected to complete the project determines an IRR. If the IRR is greater than or equal to 1%, the system returns a positive recommendation as well as graphs, tables, and charts detailing both the costs by year as well as the resulting investment-relevant calculations (including IRR, Modified IRR, and/or Multiple). Conversely, if a calculated IRR is less than 1%, the system returns a negative recommendation as well as the relevant graphs, tables, and charts. Further metrics for thresholds include at least: internal rate of return, modified internal rate of return, net cash flow, equity, costs, revenue, or any other financial metric relevant to investment decision making.

In another embodiment, revenue and costs are further calculated by the system in a "best case," "likely case," and "worst case" scenario. Thresholds are operable to be set according to each of these scenarios. For example, a best case scenario threshold is set such that the cost is greater than or equal to $1, the likely case threshold is set to $2, and the worst case threshold is set to $3. If any of the projected costs exceed these thresholds, a negative recommendation is returned.

Notably, thresholds are operable to be set relative to multiple variables relevant to a project file, including those of quantitative, qualitative, semantic, structured, and unstructured data. In another embodiment, a project file has a location in area X, and the recommendation system is configured to provide a positive recommendation if the project has a high number of LEED certified projects, an IRR of greater than 1%, and a multiple of greater than 2. The system retrieves data from an external database, which determines that area X contains a high number of LEED certified projects. The IRR is determined to be 2%, and the multiple is determined to be 1. Since the multiple does not meet the threshold requirement, the system returns a negative recommendation as well as the graphs, tables, charts, and calculations necessary to understand the project and the variables used for the recommendation. In a preferred embodiment, multiple variables are calculated for each scenario, and an IRR for each of the scenarios is derived from the calculated variables. An investment recommendation is then generated based on the IRR and a set threshold.

In retrieving information from an external database, the system is further operable to connect to partner memories, databases, and systems in order to retrieve costs, revenue, or budget information relative to a brownfield project. These costs, revenue, or budget information is further used to determine a total IRR, multiple, or other financial metric in order to derive an investment recommendation. Thus, analysis and recommendation on investment is made possible in investment opportunities in partnership with at least one other entity.

The decision engine of the present invention is further operable to determine downside scenario projections and recommendations. Downside scenario projections account for a change in the investment scenario and a modification of variables affecting a calculation of the revenue or costs in a project. For example, in one investment project, the system determines a recommendation on investment for the following situations: a base project; the base project with a 25% increase in costs; the base project with a 25% increase in costs, a 25% decrease in absorption rate, and an increased project sell out time of 25 years; the base project with a 25% increase in costs and a 25% decrease in revenue; and the base project with a 25% increase in costs, a 25% decrease in revenue, a 25% decrease in absorption rate, and an increase project sell out time of 25 years. For each of these situations, the total costs, revenue, IRR, multiple, and other values pertinent to the investment decision are calculated and presented in graphs, tables, and charts. An investment decision based on the preset thresholds for investment are provided for each downside scenario.

Note that the variables, numbers, and thresholds used in the above examples are for illustration purposes only and are not actual values for brownfield project investment. One skilled in the art will recognize that the variables, numbers, and thresholds are operable to be set or calculated at any value or interval reasonable in the art of brownfield project investment.

Budgeting also provides a variable through which the decision and recommendation engines of the present invention determine an investment recommendation. In one embodiment, a budget for a brownfield project is compared to the projected revenue and costs of the brownfield site for set number of years. If the calculated costs exceed a budget or of a net cash flow is lower than a budgeted value, the system outputs a negative recommendation for investment. Graphs, tables, and charts that account for the projected investment as well as the budgeted items are further output along with the recommendation. Line items for each cost, revenue, or budget item are included as part of the recommendation output.

Preferably, the system is operable to analyze and provide recommendations on multiple projects at a time. For example, if a project includes 10 brownfield investment sites, the system analyzes each of the 10 projects and at least one corresponding budget and provides a recommendation for each of the brownfield sites (e.g., 3 positive recommendations and 7 negative recommendations). The system is further operable to sort the recommendations according to the largest rate of return, shortest projected sell-out time, or any other variable relevant to the investment recommendation.

The system is operable to change a threshold value based on a user input through a web-based graphical user interface (GUI) or other manual computer input method, including a command line interface (CLI) or a digital spreadsheet. Thresholds are set globally as a default value and/or are set for each project file individually. Thus, a standard for a positive recommendation is set but is adjustable for individual project needs.

Upon performing the processes above to assess a potential brownfield investment site, the transformed data is stored with the matched property file in the MAP database. The transformed data includes graphs and illustrations as visual representations of the rules and matching algorithms performed by the system. For example, in one embodiment, a project file for a brownfield site in Durham, N.C. provides a map with markers indicating the population of Durham as well indications of the sizes of other comparable markets.

The processes and systems described herein are a significant improvement to the current process of brownfield investment. Brownfield investment has traditionally been focused on "optimistic" or "creative" approaches to investment leads, which leaves the investment with an unclear probability of success. These subjective approaches involve an artistic and experienced evaluator manually compiling the facts, information, and statistics about potential sites and deciding whether or not to invest based on intuition. In addition, the investment in projects as a result of this subjective process leads to projects that are driven and monitored by "inertia," or a focus on the projects that have significant interest or progress. Beneficially, the present invention provides systems and rules that direct investment decisions through a standardized process that provides streamlined, accurate management, recording, and monitoring. The ordered combination of the system components and method steps provides an inventive, non-obvious process for brownfield investment through implementation of components that allow for documentation, approval, and collaboration features that provide a specific process to brownfield investments. This process is one that was not available before computer technology, as the combination of analytical features with other interactive components provides a tool that makes concrete investment decisions and suggestions that are not dependent upon subjective processes.

The system is generally divided into pre-closing and post-closing operations. The process of closing is directly tied to the system, which allows for each step to take place in a streamlined manner.

Pre-Closing

A lead for a property is sourced or introduced to the system of the present invention through a variety of ways, including direct referral to the system through an email, web portal, or any other electronic communication. In one embodiment, a lead recognizer feature of the intranet recognizes a potential lead from the text of an email and adds the lead to the lead queue. Alternatively, a web crawler searches the Internet for potential leads on websites and adds the potential lead to a lead queue. After sourcing the lead, the lead is screened based on a variety of criteria, including location, zoning, public and/or media opinion on development in the location, lender availability, type of environmental contamination or pollution, use restrictions imposed by remediation requirements, wildlife habitat, flood plain, wetlands, airport proximity, topographical data, historical structures or areas including historic commission restrictions, easements, the need for regulatory approval for development, asking price vs. lowest price that can be offered for desirable return on investment (ROI), and any other factor pertinent to purchasing a property. Preferably, an automated screening tool screens the lead. The automated screening tool is operable to access the intranet as well as the internet and use web crawling software to determine this information if it is not provided. In one embodiment, a sourced property lead is operable to be flagged to not be screened automatically by the screening tool and is instead sent via email or another electronic messaging system to a party for review. In another embodiment, a sourced property lead is flagged for automated screening. Preferably, an electronic message alert system sends an electronic message to an account when a property lead has been screened along with the results of the screening. Screening results include recommendations such as "Pursue", "Pass", or "Further Investigation Required". If the tool recommends that the lead be pursued or further investigated, the lead is added to a leads queue for pursuit and deliberation. A due diligence spend amount and a priority of the property compared to other properties in the queue is preferably automatically defined based on the factors used in the screening criteria. A salient facts memo including the due diligence spend amount and an action plan is generated during the pursuit and deliberation phase. If the lead is passed on during the pursuit and deliberation phase, a quantifiable factor which was a reason for passing on the lead is incorporated into the screening tool to screen future leads. Preferably, the quantifiable factor relates to at least one of the factors used by the screening tool to screen leads. By way of example, wildlife habitat of a critically endangered species overlapping with the property, a percentage of the property that is in a flood plain, or the presence of a particular contaminant on the property are all bases for the screening tool to automatically recommend a pursue, pass, or further investigation action for a property with the same or similar qualities in the future.

Approval Functions

During pre-phase negotiations, each brownfield project file is created and assigned a Global Deal Identification (ID). The project file is populated with a list of requirements, stages, and resources that are initially void of information and are operable to be filled in by a user. Alternatively, the list of requirements, stages, and resources are automatically filled in with suggested information and values. This list includes at least an ability to generate, hold, and edit agreements (partnership agreements, letters of intern, term sheets, etc.), view and adjust a budget, as well as hold and edit comments, notes, and documents used internally for making investment decisions. For the agreements, the system is operable to generate a template document (e.g., a template Letter of Intent) including information about the site from the brownfield project file. Upon generation, the system is operable to allow a user to sign the document, edit it, send it to another user for approval, and send it to an external entity. When the document is sent to another user for approval, the system is further operable to alert a user with approval ability of the document in need of approval. Notably, the document is not limited to a physical, hardcopy document or a generated document from word-processor, as the documents generated include web-based files and projects that are further able to be approved.

Tasks

Additionally, a tasks function allows a user to assign tasks to a project needed for both pre-closing and post-closing procedures. Tasks are listed in the MAP system with the project they are assigned to. In one embodiment, tasks are paired with documents and files pertinent to the tasks and upon completion by a user, the tasks are automatically or manually marked as completed. For example, in one embodiment, a user overseeing a project sets up a list of all of the steps, approvals, and documents that need to be completed during due diligence phase of investment. If a second user working on the project is responsible for signing off on an agreement, the tasks function allows for the second user to download the agreement, sign it, and upload the signed document back to the server. The tasks function automatically marks the task as completed upon reupload.

Negotiation

Similar to the document management function, the negotiation function allows for communication between internal and external entities in order to negotiate agreements, deals, budgets, etc. Communication includes sending a document or contract information about the brownfield project internally or externally, as well as combining the document or information sent with the editing and signing abilities of the system. In one example, a Partnership Agreement is sent to an external source, feedback on the agreement is received by the system, the agreement is edited to reflect this feedback, and the edited agreement is sent to another entity for approval.

Furthermore, feedback and auditing features allow for users to request and send surveys, evaluations, and general feedback forms to internal and external entities and log the responses through the MAP system. Forms include large text entries, single-line text entries, radio selectors, and any other method of providing feedback information known in the art of digital feedback surveys. The system is operable to send the surveys, evaluations, and general feedback forms through the MAP system itself to another MAP user or through an external mail system to an email address. The email thereby links to the MAP system itself for guest access to the survey. Alternatively, replies to the email are automatically routed and stored in the project file.

Property leads which pass the pursuit and deliberation phase move on to the seeking control or under control phase. The seeking control phase includes collaboration on documents related to due diligence and investment in the property. This collaboration is preferably web-based and is performed through an interactive graphical user interface (GUI).

Budgeting

Budgeting implementations of the MAP system allow for a user to produce and edit a budget for a brownfield project. The budget includes at least an ability to enter in a budget estimate, wherein the budget includes both automatically calculated values and manually input values. The automatically calculated values are extracted from other files and documents in the brownfield project system, including a proposal or a term sheet. Budget values are operable to be adjusted by users, and both the initial budget and the adjusted budget are operable to be approved by users with approval capabilities. Furthermore, if a budget increases beyond a threshold set by a user, the system is operable to send an alert to one or more users and/or perform an action, including attaching a label to the project and/or cancelling the project. In one embodiment, the system sends an alert or notification to a user when a budget increases beyond $100,000 of an approved budget limit. In another embodiment, a threshold is set to send an alert when a line item or individual component of the budget increases beyond $25,000 of an approved budget limit. In further embodiments, percentage limits set the threshold to percentages of an approved budget, for example at 115% of a line item or 110% of a total budget.

Additionally, the system is operable to allow users to send budget requests and request approvals. For example, if a user requests approval for a travel expense, a user with approval capabilities is sent a notification of a request, and based on the response of the user with approval capabilities, the requesting user is notified of an approval or denial.

Post-Closing

An investment decision is made after the property lead has gone through the pursuit and deliberation phase. Upon a positive investment decision being made, regular reports are generated relating to environmental factors, construction, legal issues, milestones, and budget. These reports are automatically generated based on integration with other software including bank accounts and email accounts. Specialized hardware such as that used to measure contaminants (e.g. hydrocarbon spillages, solvents, pesticides, heavy metals including lead, and asbestos) is linked to the system of the present invention using wireless communication such as radio frequency (RF) communication, NEAR FIELD COMMUNICATION (NFC), ZIGBEE, wireless internet connectivity, cellular communications including 3G, 4G, 5G, etc. and any other form of wired or wireless communication.

For post-closing projects, the MAP system provides a history of all pre-closing activity and documents as well as an ability to monitor and adjust the project file. In one embodiment, the system provides Consumer Information Statement (CIS) resources for reviewing asset management oversight as well as ownership and relationship agreements between investors and other parties involved in the brownfield investment.

Additionally, a combination feature of the system allows for two different project files to be combined into one. When combined by a user, the images, text, documents, history, and other elements from a first project file are combined with the elements of the second file. In one embodiment, the elements of the first project file are meshed with the elements of the second file. In another embodiment, the elements of the first project file are kept separate from the second project file but are reflected in the second project file via an additional link, folder, webpage, or other mechanism of storing elements of the second project file.

Post-closing functions also include providing compensation to the appropriate parties and approving and filing income tax returns. These functions are preferably integrated with the system using payroll and tax software such that payments are scheduled and automatically made by the system.

Sample deal documents that illustrate what products of various components should look like include insurance documents that educate users on the best strategies to manage and mitigate project risk and the specific financial instruments they may use to do so.

The system further provides automated deal analysis for users with "lessons learned" from prior projects that are directly relevant to the case in point and that help project leaders avoid mistakes by providing customized comparables or case studies and workflow process diagrams and development checklists to ensure successful development outcomes.

Furthermore, the system provides an international standards organization (ISO) environmental management standards-based automated system and methods for brownfield development that includes the following features and benefits, by way of example and not limitation: Providing a structured, disciplined, cost efficient approach to managing the environmental portion of a redevelopment project. System establishes and articulates strong environmental principles and provides standard operating guidelines for execution.

The EMS further guides project managers in a 5 step-by-step process, a significant benefit in the complicated world of brownfield redevelopments where many struggle for direction. Standard Operating Guidelines direct user in the most efficient use of time and money while concurrently prescribing a high degree of environmental stewardship.

The present invention systems and methods successfully address the longstanding unmet need in the industry for providing automated, networked, and real-time access to templates and tools developed and refined over 20 years project experience with case studies, including EMS documents that are ready-to-use templates for saving time, helping to avoid mistakes by individuals, reducing expenses and/or risk, and improving safety.

The systems and methods of the present invention also enhance a user's credibility in brownfield development. By following the EMS, project leaders make a statement to stakeholders that they are committed to quality and that their commitment translates into a systematic, proven, process-based project methodology, including winning confidence of lenders, regulators, insurers, and others gain confidence that project management is thorough, disciplined and cost effective, and remotely viewable and monitorable by those entities, with secure and transparent access provided by the system user for a given project.

Also, a database of properties is provided for remote access by users, in particular for corporations owning a multiplicity of properties under development. This is particularly advantageous because brownfield development and regulations differ greatly by geographic location. Such a remote database provides for the remote users to search and research and compare projects according to a variety of factors, including but not limited to a database of properties searchable and sortable by the following factors, and combinations thereof:

Location/geographical area
type pollutant/contamination
water, air,
chemical
active/inactive facility
size
value (estimated as is, clean, cost to clean)
short term v. long term asset
urban/rural
Status, e.g., No Further Action (NFA) letter in hand.
Phase 1 complete, etc.

Furthermore, a database is provided for searching, finding, and connecting with vendors. The database is preferably web-based. Vendors include appraisers, architects, attorneys, real estate agents or brokers, environmental consultants, insurance professionals, lenders, and other specialists that assist in the process of brownfield property investment. The database is searchable through MAP and is operable to link to specific contact entries. The contact entries contain at least names, phone numbers, email addresses, physical addresses, and/or a list of involved projects. Project files are additionally operable to link to or display vendors connected to a project and provide any notes or pertinent information related to vendor interaction. In addition, the system provides synchronization abilities such that the database is operable to interface with a digital address book, contacts system, or mail client and add and/or remove vendor contact information. In one embodiment, the interfacing includes the export of all vendor entries to a separate file for import into another program (file types for contacts include vCard files, .vcf, archive files, .abbu, or any file that is operable to contain structured contact information). In another embodiment, the interfacing occurs automatically, wherein the email client or the system actively syncs the vendor information. MICROSOFT OUTLOOK is used to sync the vendor information in one embodiment. Preferably, the information is automatically synced when the information is updated.

In preferred embodiments of the present invention, different MAP skins or Graphical User Interface (GUI) formats are provided for different stakeholders to allow the system to customize MAP for different users and/or audiences to highlight most useful content for them. Also, a percent complete indicator is advantageously provided to automatically gauge or monitor progress and prompt users to take next steps.

Optionally an EPA grant point calculator and guide for grant applications is provided with the present invention; it is helpful to highlight progress and to encourage high quality, particularly on target applications, including the following factors: qualitative based on key words, and quantitative based on number of fields complete. A brownfield program application for online participation with a project is provided, including an example for new users to make the application or project account creation more efficient.

Visualization tools are helpful for soliciting community input and for demonstrating progress, either with actual photos and/or illustrations, as the project proceeds through various stages. These tools preferably provide for automatic updating at predetermined stages on a project management timetable. Alternatively, manual uploading of photographic images will trigger a corresponding automated updating of visual representations of the project that are available only to authorized project members, to the predetermined guest users, to the general public, and combinations thereof.

Preferably, in one embodiment of the present invention, an on-line version of visual representations of a project, including both images and text identifying the project phase is provided via an interactive website and graphic user interface (GUI). Where authorized, the system is adapted to allow at least one project manager to upload images and descriptions of their respective project sites to make their project image-based information available to third parties, including but not limited to universities and other creative, inexpensive design teams. Optionally, the project manager selectively authorizes multiple users from the general public to submit photographic images of the site(s) in their communities, thereby providing public exchange and input in tracking progress, and encouraging support locally for the project.

Other visualization tools include transformation slides showing illustrations of the property "as is" prior to project commencement and what it can look like in the future at predetermined stages of the project, including project completion; status reporting automatically triggered by updating images of a project, as soon as they are uploaded or inputted to the system, preferably remotely.

Additionally, an automatic, interactive GUI is coupled with the systems and methods of the present invention that provides the at least one multiple remote user(s) to create a visual model of a potential site for brownfield development with predetermined items for "drag-and-drop" objects that are selectively combinable to create a virtual project completed view.

Furthermore, the system is operable to retrieve and store mapping elements from external databases, such as publicly available Geographic Information System (GIS) data—and display this information in the MAP system. The interactive GUI is operable to display the geographic location data in a map with property boundaries along with information about the site, including spatial data analysis integrating real estate, demographic, environmental, community, psychographic, and other parameters that help to indicate value for potential sites. Other GIS information includes at least an address, current owner, building and land value, build date, and property size. GIS information also advantageously includes map overlay views of population density achievable in the entitlement process, use restrictions imposed by remediation requirements, wildlife habitat, flood plain, wetlands, airport proximity, topographical data, historical structures or areas including historic commission restrictions, easements, areas where regulatory approval is needed, etc. In one embodiment, visualization for regulatory approval also includes indications of typical timelines for receiving regulatory approval in the relevant location. The GIS system also includes links to GIS comparable properties or "comps" in one embodiment, with a split screen view operable to show one or more GIS comparable properties. Typical service provider costs and turnaround times are also displayed on the GIS map for the relevant location. In another embodiment, potential funding information is included in the GIS map relative to the property. Private funding factors are represented using visual indicia for market comparison, development milestones required by lenders for funding, lenders' willingness to assume environmental risk, and include color coding, shading, and/or icons to indicate levels of desirability or risk. Public funding factors include jurisdictional experience with issuing relevant securities in size range, capital market capacity for issuance, municipality credit health, headline risk, and land plan harmony with public finance objective, and are also indicated visually or textually on the GIS map. Historical opposition to development, proposed use vs. current zoning and press and public attitude towards development are also indicated visually or textually in the GIS. For any factors involving comparison (ex: comparing proposed use to the current zoning), a degree of difference is indicated using color overlays, such as using red to indicate a large degree of difference and low probability of success, brown to indicate a moderate degree of difference and moderate probability of success, and green to indicate a low degree of difference and high probability of success. Advantageously, any information included in the GIS is also operable to be included in text format or any graphical format in the record of the property on the internet or intranet. The interactive map is displayed within a project file along with any information describing the site as well as history and documents from pre-closing and post-closing processes.

The present invention further includes decision analysis tools for helping with planning, evaluation, and/or execution of projects, including prioritization and/or ranking of projects, in addition to main benefits of the systems and methods of the present invention, including but not limited to saving money, reducing time, and ensuring positive outcome from environmental, health, and/or safety perspectives.

Certain modifications and improvements will occur to those skilled in the art upon a reading of the foregoing description. By way of example and not limitation, systems and methods of the present invention for providing risk management and containment of brownfield property assets for lenders, insurance providers, investors, stakeholders, and combinations thereof, including a key aspect of the EMS being to obtain environmental insurance, the purpose of which is to limit cost of remediation, which is often hard to project at a project's onset. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for cloud based, multi-user assessment of brownfield real estate assets comprising:
    at least one server computer constructed and configured to assess, manage, and display data relating to a list of brownfield assets;
    at least one memory and database operable to store technical data, documents, and budget information related to the list of brownfield assets; and
    a web crawler in network communication with the at least one server computer;
    wherein the list of brownfield assets includes brownfield assets automatically compiled by the web crawler;
    wherein the at least one server computer automatically analyzes information related to at least one brownfield asset on the list of brownfield assets and at least one previous brownfield asset, wherein the information includes revenue and projected or calculated costs;
    wherein the information further includes demographics, real estate performance and trends, environmental sustainability, political risks and public policy, and/or development partner potential;
    wherein the information is extracted from internal data sources and a Geographic Information System (GIS), aggregated within the at least one memory and database, and matched to existing data or project files;
    wherein the automatic analysis includes extracting property variables from the GIS and matching the property variables to internal data extracted from the internal data sources;
    wherein, based on the matching, the at least one server computer is operable to generate a sum of all cash inflow and a sum of all expenses for each of the matched property variables;
    wherein the at least one server computer is operable to determine at least two projected rates of return from the generated sum of all cash inflow and the generated sum of all expenses for at least one brownfield asset on the list of brownfield assets;
    wherein the information extracted from internal data sources is based on user-input data;
    wherein, based on at least one preset threshold, the at least one server computer is operable to generate an investment recommendation based on the analysis and the matched data or project files;
    wherein the at least one server computer is further operable to receive at least one pass indication and at least one variable of the analysis;
    wherein the at least one server computer is operable to update the internal information based on the pass indication and the at least one variable;
    wherein the system is operable to consider pass indications and related variables in generating subsequent investment recommendations;

a web-based graphical interface hosted on the at least one server computer, wherein the web-based graphical interface is operable to:
store input data relating to the list of brownfield assets in the at least one memory and database;
search and sort the stored input data based on brownfield information categories, including demographics, real estate performance and trends, environmental sustainability, political risks and public policy, and/or development partner potential to generate a filtered selection of brownfield assets;
retrieve and display the stored input data relating to the filtered selection of brownfield assets in graphical charts, maps, and graphs;
communicate the stored input data to an internal or external entity;
wherein the user-input data includes documents, pictures, tasks, and budget information relating to the at least one brownfield asset on the list of brownfield assets;
wherein the tasks are automatically generated by the at least one server computer based on default tasks;
wherein at least one user of the multi-user distributed system is operable to approve and manage the documents, pictures, tasks, and budget information;
wherein at least one of the documents corresponds to at least one of the tasks and is automatically generated based on the stored input data; and
wherein the system generates an alert or notification if a line item of a budget exceeds an approved amount.

2. The system of claim 1, further comprising an Environmental Management System (EMS) accessible through the web-based graphical interface.

3. The system of claim 1, wherein the at least one server computer outputs the information related to the at least one brownfield asset on the list of brownfield assets and the at least one previous brownfield asset in a digital spreadsheet, including the analyzed information, wherein the digital spreadsheet is searchable and editable.

4. The system of claim 1, wherein the budget is automatically generated from the documents and the budget information corresponding to the at least one of the brownfield assets.

5. The system of claim 1, wherein an administrator user account is operable to assign and manage tasks relating to the at least one brownfield asset on the list of brownfield assets.

6. The system of claim 1, wherein the information, documents, pictures, tasks, and budget information for each of the at least one brownfield asset on the list of brownfield assets is stored in a corresponding project file with a Global Deal ID.

7. The system of claim 1, wherein the web-based graphical interface is further operable to store vendor data, wherein the vendor data includes fields for at least names, phone numbers, email addresses, physical addresses, and a list of involved projects.

8. The system of claim 1, wherein the documents are operable to be signed, edited, and sent through the web-based graphical interface.

9. The system of claim 1, wherein the brownfield assets compiled by the web crawler are automatically screened by an automatic screening tool before being added to the list of brownfield assets, wherein the automatic screening of the brownfield assets compiled by the web crawler results in a decision regarding whether each brownfield asset passes the automatic screening, fails the automatic screening, or requires further investigation, wherein passing the automatic screening means the brownfield asset is added to the list of brownfield assets and failing the automatic screening means the brownfield asset is not added to the list of brownfield assets.

10. The system of claim 9, wherein the automatic screening of the brownfield assets compiled by the web crawler is based on quality control information for the property, wherein the quality control information for the property includes location, zoning, public and/media opinion on development in the location, lender availability, type of environmental contamination or pollution, use restrictions imposed by remediation requirements, wildlife habitat, flood plain, airport proximity, topographical data, historical structures or areas, easements, and/or need for regulatory approval for development for the property.

11. The system of claim 10, wherein the web crawler automatically provides the quality control information for each brownfield asset.

12. The system of claim 9, wherein an automatic alert message is generated after the automatic screening of the brownfield assets compiled by the web crawler, wherein the automatic alert message includes the decision of the automatic screening for each brownfield asset.

13. The system of claim 12, wherein if the automatic screening tool determines that further investigation is required for a particular brownfield asset and the particular brownfield asset is determined to have failed in a further investigation, then the automatic screening tool is updated with a quantifiable factor regarding the decision to fail the particular brownfield asset, wherein the quantifiable factor is included in the automatic screening for subsequent brownfield assets.

14. A method for cloud based, multi-user assessment of brownfield real estate assets comprising:
a web crawler automatically compiling brownfield assets;
providing at least one server computer constructed and configured to assess, manage, and display data relating to a list of brownfield assets, wherein the list of brownfield assets includes the brownfield assets automatically compiled by the web crawler;
providing at least one memory and database operable to store technical data, documents, and budget information related to the list of brownfield assets;
extracting and automatically analyzing information related to at least one brownfield asset on the list of brownfield assets and at least one previous brownfield asset, including revenue and projected or calculated costs, wherein the information is extracted from internal data sources and a Geographic Information System (GIS);
aggregating the information within the at least one memory and database, and matching the information to existing data or project files, wherein the information includes extracted property variables from the GIS;
matching the property variables to internal data extracted from the internal data sources;
wherein the information further includes demographics, economics, real estate performance and trends, environmental sustainability, political risks and public policy, and/or development partner potential;
based on the matching, generating a sum of all cash inflow and a sum of all expenses for each of the matched property variables;
determining, based on the generated sum of all cash inflow and the generated sum of all expenses, at least two projected rates of return for the at least one brownfield asset on the list of brownfield assets as part of the automatic analysis;

generating, based on at least one preset threshold, an investment recommendation based on the analysis and the matched existing data or project files;

receiving at least one pass indication and at least one variable of the analysis;

updating the internal information based on the pass indication and the at least one variable;

considering pass indications and related variables in generating subsequent investment recommendations;

providing a web-based graphical interface hosted on the at least one server computer, the web-based graphical interface:
storing input data relating to the list of brownfield assets in the at least one memory and database;
searching and sorting the stored input data based on brownfield information categories, including demographics, real estate performance and trends, environmental sustainability, political risks and public policy, and/or development partner potential to generate a filtered selection of brownfield assets;
retrieving and displaying the stored input data relating to the filtered selection of brownfield assets in graphical charts, maps, and graphs, including documents, pictures, tasks, and budget information relating to at least one brownfield asset of the filtered selection of brownfield assets;

automatically generating tasks based on default tasks;

at least one user of the multi-user distributed system approving and managing the documents, pictures, tasks, and budget information;

automatically generating at least one of the documents, wherein the at least one of the documents corresponds to at least one of the tasks; and generating an alert or notification if a line item or a total of a budget exceeds an approved amount.

15. The method of claim 14, further comprising providing an Environmental Management System (EMS) accessible through the web-based graphical interface.

16. The method of claim 14, further comprising outputting the information related to the at least one brownfield asset on the list of brownfield assets and the at least one previous brownfield asset in a digital spreadsheet, including the automatically analyzed information, wherein the digital spreadsheet is searchable and editable.

17. The method of claim 14, further comprising automatically generating the budget from the documents and the budget information relating to the at least one of the brownfield assets.

18. The method of claim 14, further comprising assigning and managing tasks relating to the at least one of the brownfield assets through an administrator user account.

19. The method of claim 14, further comprising storing the information, documents, pictures, tasks, and budget information for each of the at least one brownfield asset on the list of brownfield assets in a corresponding project file with a Global Deal ID.

20. A system for cloud based, multi-user assessment of brownfield real estate assets comprising:
at least one server computer constructed and configured to assess, manage, and display data relating to a list of brownfield assets;
at least one memory and database operable to store technical data, documents, and budget information related to the list of brownfield assets;
a web crawler in network communication with the at least one server computer; and
at least one mobile device accessible to input the technical data, documents, and budget information related to the list brownfield assets, including geolocation information;
wherein the list of brownfield assets includes brownfield assets automatically compiled by the web crawler;
wherein the at least one server computer automatically analyzes information related to at least one brownfield asset on the list of brownfield assets and at least one previous brownfield asset, wherein the information includes revenue and projected or calculated costs;
wherein the information further includes demographics, real estate performance and trends, environmental sustainability, political risks and public policy, and/or development partner potential;
wherein the information is extracted from internal data sources and a Geographic Information System (GIS), aggregated within the at least one memory and database, and matched to existing data or project files;
wherein the automatic analysis includes extracting property variables from the GIS and matching the property variables to internal data extracted from the internal data sources;
wherein, based on the matching, the at least one server computer is operable to generate a sum of all cash inflow and a sum of all expenses for each of the matched property variables;
wherein the at least one server computer is operable to determine at least two rates of return from the generated sum of all cash inflow and the generated sum of all expenses for the at least one brownfield asset on the list of brownfield assets;
wherein the information extracted from internal data sources is based on data input by the at least one mobile device;
wherein the at least one server computer generates a spreadsheet with the analyzed information and a recommendation for investment based on the analysis and the matched existing data or project files;
wherein the at least one server computer is further operable to receive at least one pass indication and at least one variable of the analysis;
wherein the at least one server computer is operable to update the internal information based on the pass indication and the at least one variable;
wherein the system is operable to consider pass indications and related variables in generating subsequent investment recommendations;
a web-based graphical interface accessible by the at least one mobile device and hosted on the at least one server computer, wherein the web-based graphical interface is operable to:
store input data relating to the list of brownfield assets in the at least one memory and database;
search and sort the stored input data based on brownfield information categories, including demographics, real estate performance and trends, environmental sustainability, political risks and public policy, and/or development partner potential to generate a filtered selection of brownfield assets;
retrieve and display the stored input data relating to the filtered selection of brownfield assets in graphical charts, maps, and graphs;

wherein the input data includes documents, pictures, tasks, and budget information relating to the at least one of the brownfield asset on the list of brownfield assets;

wherein the tasks are automatically generated by the at least one server computer based on default tasks;

wherein at least one user of the multi-user distributed system is operable to approve and manage the documents, pictures, tasks, and budget information;

wherein at least one of the documents corresponds to at least one of the tasks and is automatically generated based on the stored input data; and wherein the system generates an alert or notification if a line item or a total of a budget exceeds an approved amount.

* * * * *